United States Patent
Ryan et al.

[11] Patent Number: 5,785,795
[45] Date of Patent: Jul. 28, 1998

[54] SYSTEM AND APPARATUS FOR DELAMINATING A LAMINATE CONTAINING IMAGE BEARING MEDIA

[75] Inventors: James F. Ryan, Marlboro; Alfredo G. Kniazzeh, West Newton, both of Mass.

[73] Assignee: Polaroid Corporation, Cambridge, Mass.

[21] Appl. No.: 403,342

[22] Filed: Mar. 14, 1995

[51] Int. Cl.$^6$ .................................................. B32B 35/00
[52] U.S. Cl. ........................... 156/344; 156/584; 430/256
[58] Field of Search .................................. 156/344, 584, 156/230, 235; 271/280, 281, 285; 430/256, 257, 258, 259, 260, 261; 354/354

[56] References Cited

U.S. PATENT DOCUMENTS

| | | | |
|---|---|---|---|
| 3,404,057 | 10/1968 | Heiart | 156/522 |
| 3,536,571 | 10/1970 | Grundman | 156/584 |
| 4,416,718 | 11/1983 | Fair, Sr. | 156/584 X |
| 4,631,110 | 12/1986 | Tsumura et al. | 156/344 X |
| 5,141,584 | 8/1992 | Schuh et al. | 156/344 |
| 5,155,003 | 10/1992 | Chang | 430/200 |
| 5,164,280 | 11/1992 | Texter et al. | 430/202 |
| 5,169,476 | 12/1992 | Silveira et al. | 156/344 |
| 5,178,979 | 1/1993 | Higashiyama et al. | 430/14 |
| 5,200,297 | 4/1993 | Kelly | 430/253 |
| 5,203,942 | 4/1993 | DeCook et al. | 156/230 |
| 5,294,514 | 3/1994 | Lynch et al. | 430/203 |
| 5,300,398 | 4/1994 | Kaszczuk | 430/200 |
| 5,308,739 | 5/1994 | Uytterhoeven | 430/258 |
| 5,501,940 | 3/1996 | Bloom et al. | 430/256 X |

FOREIGN PATENT DOCUMENTS

| | | | |
|---|---|---|---|
| 62-77985 | 4/1987 | Japan | 430/260 |
| WO 88/04237 | 6/1988 | WIPO | G03F 7/34 |

OTHER PUBLICATIONS

Patent Abstracts of Japan, vol. 011, No. 344 (M–640), 11 Nov. 1987 & JP,A,62124991 Olumpus Optical Co Ltd), 6 Jun. 1987 (See Abstract).
Patent Abstracts of Japan, vol. 014, No. 196 (M–0964), 20 Apr. 1990 & JP,A,02038090 (Unitika Ltd), 7 Feb. 1990, (See Abstract).
WO,A,92,09930 (Polaroid Corp) (11 Jun. 1992 cited in the application (See Abstract);Figures.
Notification of Transmittal of the International Search Report or the Declaration and the Search Report.

*Primary Examiner*—Mark A. Osele
*Attorney, Agent, or Firm*—Leslie Payne

[57] ABSTRACT

A method and system are disclosed for controlling the temperature of a delaminating surface in a range which reduces the formation of pinholes in an image bearing layer on an image bearing medium upon release of a laminated protective coating from its carrier web during delamination of the medium from the carrier web, as well as minimizes the formation of laminating artifacts in the image bearing medium.

15 Claims, 3 Drawing Sheets

SYSTEM AND APPARATUS FOR DELAMINATING A LAMINATE CONTAINING IMAGE BEARING MEDIA

CROSS-REFERENCE TO RELATED APPLICATION

The present invention is related to copending and commonly assigned U.S. patent application Ser. No. 08/240,854 filed on May 10, 1994, now U.S. Pat. No. 5,582,669 and entitled "METHOD AND APPARATUS FOR PROVIDING A PROTECTIVE OVERCOAT ON AN IMAGE BEARING MEDIUM".

BACKGROUND OF THE INVENTION

In general, the present invention relates to systems and methods for delaminating laminates, and more particularly, to systems and methods for delaminating protective overcoating layers on an image bearing medium in a manner which minimizes the formation of artifacts in the image bearing medium.

A recent development in the image forming arts employs the use of thermal imaging laminates for achieving high quality, high resolution images, such as for radiological images useful in the medical arts. Examples of such media are described in commonly-assigned International Patent Application No. PCT/US 87/03249 published Jun. 16, 1988, under International Publication No. WO 88/04327; and U.S. Pat. No. 5,200,297. More particularly, the noted International Patent Application describes a thermal imaging medium and a process for forming an image. The medium is a laminate in which an image forming layer thereof is a porous or particulate imaging material, preferably, a layer of carbon black that is deposited on a heat-activatable image-forming surface of a first sheet-like element. The image forming layer has an adhesive strength to a first sheet-like element of the laminate that is a function of its exposed state. The first sheet-like element carrying the imaging material is covered with a second sheet-like element that is laminated to the first so that the imaging material is confined between the first and second sheets.

This medium can be imagewise exposed as by laser scanning, whereby exposed portions of the imaging material are firmly attached to the first sheet, and unexposed portions of the imaging material are firmly attached to the second sheet. The result is a first image surface which comprises exposed portions of an image-forming substance that is more firmly attached to the first sheet and a complementary second image surface which comprises non-exposed portions of the image-forming substance carried or transferred thereto.

After imaging in the manner noted, the sheets are then peeled or delaminated with the first sheet carrying exposed imaging material portions, and the second element carrying unexposed portions. As a result of the peeling, a pair of complementary or binary image layers is obtained, either one of which may for reasons of informational content be considered the principal image area. Such image forming materials and processes are capable of producing extremely high quality and high resolution images.

However, there are possibilities for damaging the image layer by physical contact, physical elements or the like. Therefore, it is desirable to protect the image forming layer. One known approach is through the application of a protective overcoating material, e.g. a thin, transparent, but durable layer, such as described in International Patent Application No. PCT/US91/08345 (Publication No. WO 92/09930) (Fehervari et al.); and pending U.S. application Ser. No. 08/065345 now U.S. Pat. No. 5,501,940 (Bloom et al.). Lamination of protective overcoats, such as those described in the cited patent applications, have been accomplished by using a continuous roll, i.e. carrier web, to transfer the durable protective layer to the image carrying sheets. Activation energy is necessary for fusing the durable layer to the imaged sheet at a nip formed by and between a pair of compression rollers.

While such laminating approaches are successful, nevertheless possibilities exist for artifacts, such as pinholes, being formed in the laminated image sheet when the latter is delaminated from the carrier web. Pinholes are considered to be disruptions in the image forming or bearing layer which permit the undesired passage of light therethrough. For instance, pinholes can vary in size from about 10 to 300 microns. During delamination of the imaged sheet, some of the image bearing particles can be physically removed because of being adhered to the release layer of the overcoating material on the carrier web. While pinholes are not necessarily large, their presence can otherwise diminish achievement of the high resolution achievable by the foregoing type of imaging media. As a result of such pinholes of this removal type, the final imaged product may not be commercially acceptable. Accordingly, there is a continuing desire for improving upon known efforts to enhance the protection of the image layer while reducing the formation of undesirable pinholes which might adversely affect image quality.

SUMMARY OF THE INVENTION

According to the present invention, provision is made for improving upon known methods and systems for reducing pinhole formation in image bearing material on an image carrying medium. In one embodiment, provision is made for improved methods and systems for delaminating a web laminate carrying an image protective overcoating material after such material has been laminated onto the image bearing layer carried on an image carrying medium by heat and pressure applying means. A delamination assembly is utilized as well as means for advancing the web in a first direction against the delamination assembly as well as for advancing the medium in a direction different from the first direction. Provision is made for controlling the temperature of the delaminating assembly for reducing the formation of pinholes in the image bearing layer upon release of the overcoating material during delamination.

In another illustrated embodiment, a system is provided for controlling the temperature so as to be in a range effective for reducing the pinhole formation while minimizing physical distortions to the image bearing medium.

In an illustrated embodiment, provision is made for maintaining the carrier web and image bearing medium in a temperature range of about 90° F. to 160° F.

In another embodiment, the means for controlling the temperature comprises at least a surface on the delaminating member having a thermal heat transfer of coefficient which is effective for controlling heat exchange so as to maintain the temperature within the range.

In still another embodiment, the means for controlling temperature comprises means for directing air passed the delamination assembly for controlling its temperature.

In still another embodiment, the temperature controlling means includes a heating element for actively heating the delaminating assembly.

In another embodiment, there is provided a method of delaminating a carrier web laminate carrying an image protective overcoating material after the overcoating material has been laminated onto image-bearing material on a sheet by the application of heat and pressure. The method comprises the steps of: bending the carrier web against a delaminating assembly, advancing the carrier web in a first direction; advancing the image carrying sheet in a direction different from the first direction, and controlling the temperature of the carrier web and the sheet at a point delamination adjacent the delaminating assembly for minimizing the formation of pinholes in the image bearing layer. In another embodiment, provision is made for controlling the predetermined temperature to be within a range effective for reducing pinhole formation while minimizing physical distortions to the sheet. In still another embodiment, there is provided a method of controlling the temperature to within the predetermined range.

Other objects and further scope of applicability of the present invention will become apparent when reading the following detailed description thereof when taken in conjunction with the accompanying drawings wherein like parts are represented by like reference numerals throughout the several views.

DETAILED DESCRIPTION

Figure 1:
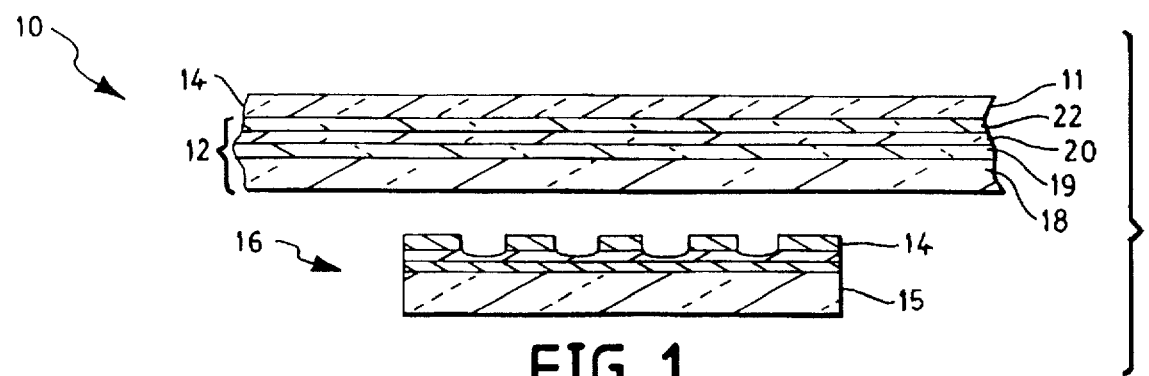
FIG. 1 is a diagrammatic cross-sectional side elevational view of a web and an image carrying medium prior to lamination.
Figure 2:
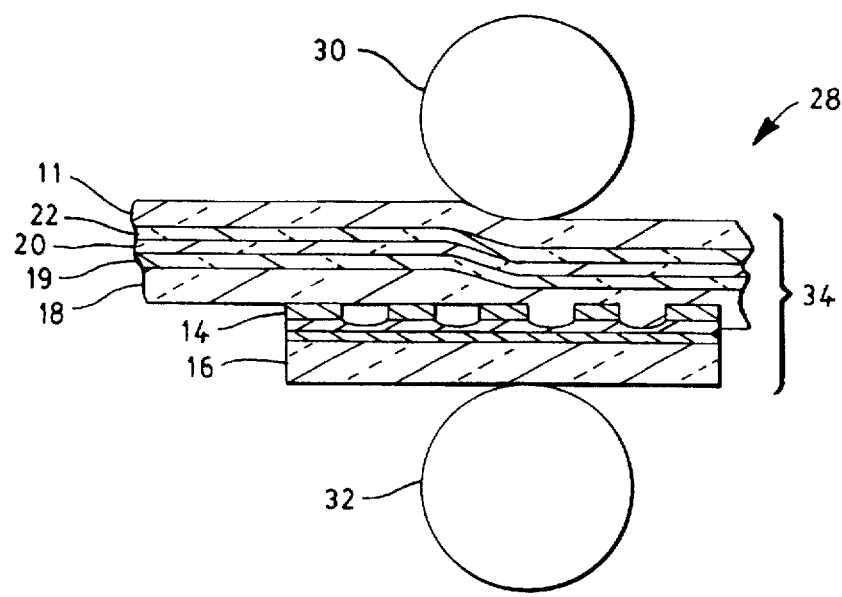
FIG. 2 is a diagrammatic cross-sectional side elevational view of the web and the image carrying medium of FIG. 1 during lamination.
Figure 3:
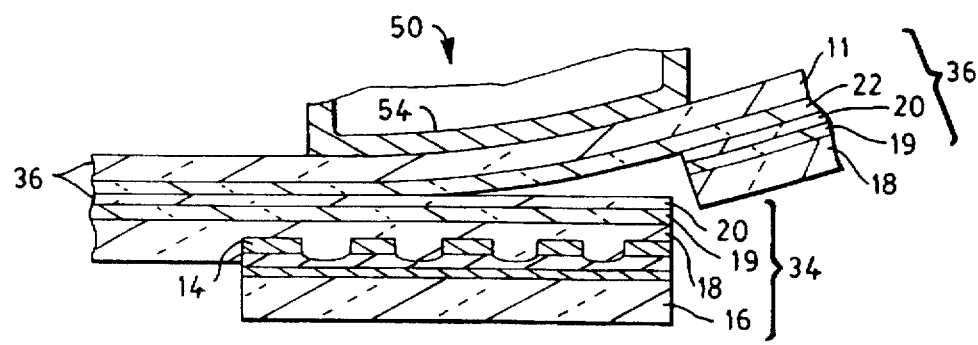
FIG. 3 is a diagrammatic cross-sectional side elevational view of a protective overcoat bonded to an image carrying medium in the process of delamination.

In one preferred embodiment, as illustrated in FIGS. 1-4, there is provided a laminating sheet 10 comprising a carrier web 11 and in juxtaposed relationship thereto a protective overcoating material 12 adapted to be laminated onto an image forming or bearing layer 14 carried on a substrate 15 of an image bearing sheet or medium 16 for purposes of protecting the latter. The web 11 and its integral protective coating material 12 form a laminating sheet which can be like that described in the last noted patent applications. Essentially, the web 11 forms a support layer for the overcoating materials 12 which overcoating materials comprise an exterior adhesive layer 18, a barrier layer 19, an intermediate durable layer 20, and a release layer 22. The protective overcoat, i.e. a thermal transfer overcoat, is thermally bonded to the image bearing medium 16 including the image bearing layer 14 in a laminating process to be described. Preferably, the release layer would be completely removed from the durable layer following lamination. However, in practice, the release layer does not cleanly separate from the durable layer, so that upon delamination of the carrier web some of the porous particles forming the image forming layer 14 are unnecessarily removed therewith. Accordingly, undesirable pinholes or openings can be formed in the image forming layer, thereby permitting light to pass therethrough. These pinholes, although not shown, usually range in shape and size from about 10 to about 300 microns.

FIG. 1 illustrates the laminating sheet 10 disposed in juxtaposed relationship over the image carrying medium 16. In the illustrated embodiment, the image carrying or bearing medium referred to as a keeper includes an image bearing layer 14 which is made of, for example, carbon particles formed on a transparent substrate layer 15 made of, for example, polyester. It will be understood that the image forming medium 16 has had another polyester layer (not shown) and complementary layer (not shown) of carbon particles removed therefrom, the removed particles are referred to as a throwaway layer. In the illustrated embodiments, the thicknesses of the keeper or image forming medium 16 and the noted throwaway layer can be about 0.5 to 10 mil. and 0.5 to 7 mil; respectively. For a more detailed description of this type of thermal imaging media, reference is made to the aforementioned International Patent Application No. PCT/US87/03249 (Etzel) which is incorporated herein by reference. Examples and methods of obtaining an image carrying medium 16 may be had from the description in U.S. Pat. No. 5,155,003; and, U.S. Pat. No. 5,200,297; which descriptions are incorporated herein by reference. While these examples all relate to imaging media wherein the image forming or bearing surfaces are porous or the particulate image bearing surfaces are developed by laminar separation, use of the present invention is not limited to developed thermal imaging media, but rather, can also be used advantageously for the protection of images prepared by resort to other known imaging methods including, but not limited to, those prepared by thermal dye transfer, ink jet, and laser ablation transfer methods.

Reference is made back again to the laminating sheet 10, which in this embodiment is in the form of a continuous web having a width generally wider than the image bearing or carrying medium 16 for ensuring complete lamination coverage of the image carrying surface. The web 11 can be formed of any material, such as a filled polyester film base, which supports the thermal transfer overcoating material. Some characteristics of the web 11 are that it has no subcoats. The web widths can vary from about 22 inches to 63 inches with roll lengths being 20,000 to 40,000 linear feet. Of course, other dimensions for the laminating sheet can be employed given the particular medium being laminated. Film roughness can be approximately 0.2μ RMS. Unrestrained heat shrinkage values are about 4% in both the machine and transverse directions when measured at 150° C. for 30 min. The thickness can be about 0.92 mil, but other thickness dimensions can be used consistent with the principles of the present invention.

The web 11 may be formed from any material, besides the noted polyester material, so long as it can withstand the conditions which are required to laminate the protective overcoat material 12 to the image carrying medium 16. If desired, the web 11 may be treated with a subcoat or other surface treatment, as well-known, to those skilled in the coating art, to control its surface characteristics, for example, increase or decrease the adhesion of the durable layer 20 to the web 24 by means of the release layer 22. The web 11 should be sufficiently coherent and adherent to the durable layer 20 to permit displacement of both the web 11 and part of the release layer 22, away from the protected laminated image carrying medium including removal of those portions of the laminating sheet 10 which extend beyond the periphery of the medium 16.

With reference to the thermal overcoat material, the durable layer 20 may be formed from any material (such as a cured acrylic polymer or a polymethacrylate) which confers the desired properties for protecting the image. For example, the aforenoted International Patent Application No. PCT/US91/08345 describes an embodiment wherein the durable layer 20 is coated as a discontinuous layer from a latex which clears during lamination to produce a clear durable layer. As described, the durable layer is comprised 80% by weight acrylic polymer, 10% by weight polyethylene/paraffin wax, and 10% by weight aqueous-based polyamide binder, and was prepared by mixing the polymer and wax lattices, adding the binder, then adding a silicone surfactant. In general, it is preferred that the overcoating material 12, when laminated over the binary image bearing layer, not have a thickness greater than about 30 micrometers, since thicker overcoating layers may, in some cases, cause problems in viewing the image due to optical effects within the overcoating material 12. Desirably, the thickness of the durable layer 20 does not exceed 10 micrometers, and, more desirably, this thickness is in the range of 3 to 6 micrometers. The durable layer 10 should of course be abrasive and chemically resistant to materials with which it is likely to come into contact, including the materials which may be used to clean the protected laminated image carrying medium. Although the exact materials which may contact the image will vary with the intended uses of the protected laminated image carrying medium, in general it is desirable that the material for the durable layer 20 should be resistant to and substantially unchanged by any materials with which it may come into contact, such as water, isopropanol and petroleum distillates.

It will be appreciated that the protection of the image carrying medium 16 conferred by the protective overcoat is improved with increased lubricity. Therefore, at least one of a wax, a solid silicone and silicone surfactant is, preferably, included in the durable layer 20 to increase the lubricity of this layer. Also, the release layer 22 can be composed of a material having high lubricity.

Referring back to the release layer 22, it may break unevenly so that part of the release layer having a discontinuous thickness remains with a discard or throwaway layer or sheet 36 and another part of the release layer 22 remains attached to the durable layer 20 on the keeper substrate sheet or medium 16. As noted, however, pinholes in the image forming layer, which are referred to as the removal type, are caused when particulate pieces or chunks (not shown) of the carbon of the image forming layer 14 tend to adhere to and go with the part of the release layer 22 remaining with the throwaway layer 36; see FIG. 3. It will be seen that the throwaway layer 36 will include the entire laminating sheet when it is not laminated to the image bearing medium 16.

Now referring to the adhesive layer 18 of the coating material 12, it is disposed on the surface of the durable layer 20 remote from the web 11. During lamination, the durable layer is adhered to the image layer 14 by means of the adhesive layer 18. The use of an adhesive layer 18 is desirable to achieve strong adhesion between the durable layer 20 and the image carrying medium 16. Various types of adhesive may be used to form the adhesive layer 18. For example, the adhesive layer 18 might be formed from a thermoplastic adhesive having a glass transition temperature in the range of about 185° F., in which case bondability is effected by the conductive heating of the adhesive layer above its glass transition temperature. An example of a suitable adhesive layer 18 is designated X95-180. The barrier layer 19 is preferred to be an aqueous barrier coating which performs solvent resistance functions. It can be a PVDC material, such as Daran 158. A laminating sheet 10 which comprises the above laminar constructions is available from Polaroid Corporation, Cambridge, Mass., USA.

Figure 4:
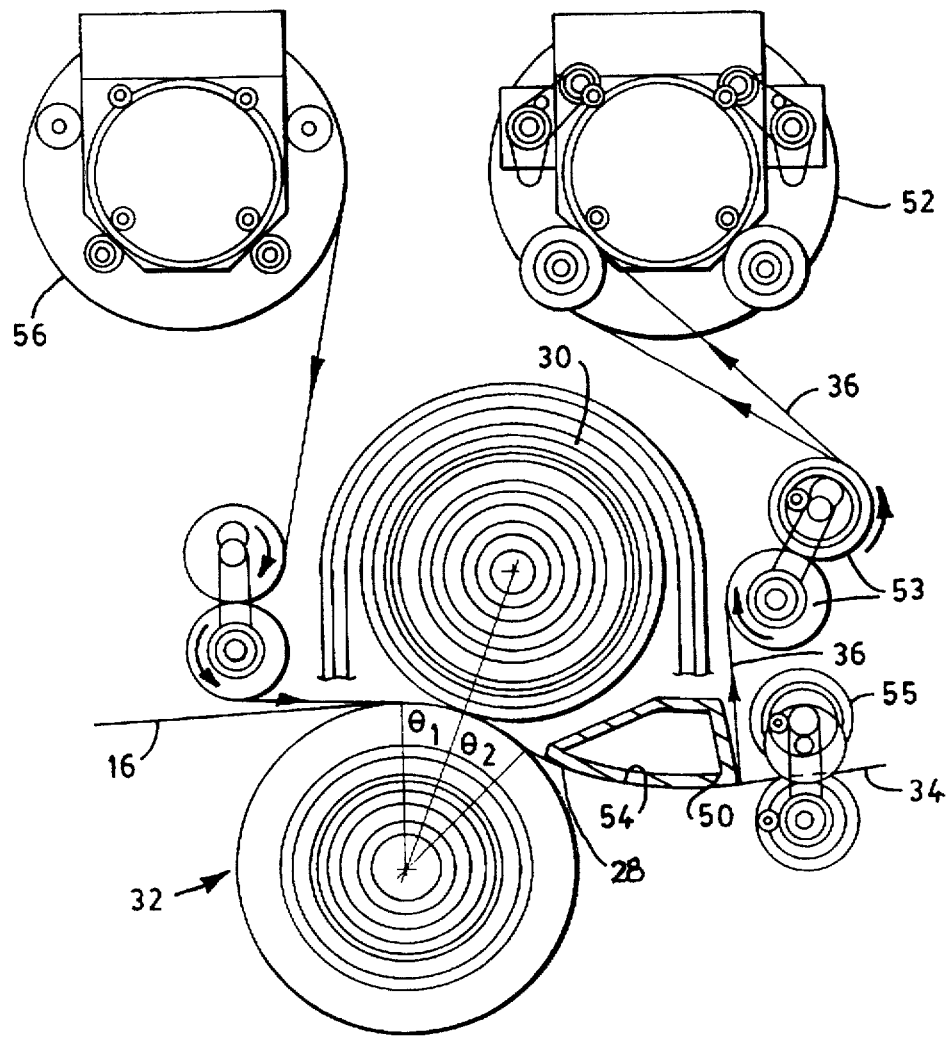
FIG. 4 is a diagrammatic side view of a laminating and delaminating system according to a preferred embodiment of the invention shown in one mode of operation; and, FIG. 5 is a diagrammatic side view of another embodiment of the system similar to FIG. 4 in which there are shown a blower and heating element for controlling temperature of a delaminating bar.

In the laminating system of FIG. 4, the laminating sheet 10 is juxtaposed to the image carrying medium 16 and both are fed together at a suitable rate, such as about 0.5 inches per second to a laminating unit. Both the sheet 10 and the image bearing medium 16 travel through a compression nip 28 formed between a heated roller assembly 30 which is about 3.5 inches in diameter and is actively heated by a heating device (not shown), and a cold roller assembly 32 which is also approximately 3.5 inches in diameter, and is actively cooled by a cooling device (not shown). As will be noted hereinafter, the sheet 10 and the medium 16 can be prewrapped onto an angular portion of the cold roller assembly 32. A variety of heating devices can be used to heat the heated roller assembly 30. For instance, the heating device can take the form of an interior resistance cartridge controlled by an external thermistor spaced near the top surface of the hot roller. The heated roller assembly 30 is preferably maintained at a temperature of about 320°±5° F. and the cold roller assembly 32 is, preferably, maintained at a temperature of about 90° F. or less in order to minimize ripple and curl in the protected laminated image carrying medium 34; as described in greater detail in the last noted applications. Both the hot roller assembly 30 and the cold roller assembly 32 should be constructed from conductive materials, such as aluminum, and at least one of the rollers should have a compliant elastomeric layer to evenly distribute a nip loading of about 800 lb. Referring back to the cold roller assembly 32, any commercially available cooling unit can be used to actively cool the temperatures which are desired. The cold roller assembly 32 can be cooled either internally, such as by circulating cool air or a liquid coolant through the interior of the roller, or externally, such as by fanning cooled air over the cold roller surface. The structure of the cold roller assembly 32 can be designed to maximize the cooling effect of the cooling unit. For instance, a cold roller cooled by air flow could be designed as a hollow roller with internal fins.

As the laminating sheet 10 and the image carrying medium 16 are fed through the nip 28, a bonded image carrying medium 34 is formed due to the adhesive layer 18 softening, molding to, and adhering to the image carrying medium under a compressive force for a time sufficient to promote adhesion of it and the barrier layer, the durable layer and portions of the release layer.

After passing through the nip 28, the bonded sheet and image carrying medium 16, designated jointly as the bonded image carrying medium 34, are postwrapped along the cold roller assembly 32 for an arcuate distance defined by the angle $\theta_1$, where $\theta_1$ is ideally about 20 degrees. However, this angle can vary for the reasons noted in the above noted application for eliminating some types of laminating artifacts, such as longitudinal curl and ripples, in the protected laminated image carrying medium 34. The purposes for postwrapping the laminated or bonded image carrying 34 are noted in the last noted application. Basically, the first is to counter a curl tendency when the sheet 10 is prewrapped along the hot roller assembly 30; the second is extracting heat from the bonded image carrying medium 34 along the cold roller assembly 32 for eliminating ripples in the protective overcoat; a third is to prevent thermal expansion from buckling the sheet 10 and thereby imparting ripples thereto; and, the fourth is to maintain a bond between the sheet 10 and the cold roller assembly 32 during a time in which the web temperature is high enough to otherwise distort the web dimensions, compromising registration quality. The degree of postwrap angles at which the sheet and the medium 16 contact the lower cold roller do not form part of the present invention and will not be discussed herein in further detail. Also, the sheet 10 and the image bearing medium 16 are prewrapped for the reasons noted in said application and the prewrap angles can also vary. However, reference is made to the noted copending patent application for a more detailed description thereof.

For purposes of understanding curl, it is defined as any curvature of the protected laminated image carrying medium 34 away from the plane of its major surface area. Curl can occur in either the longitudinal direction which is the direction of feeding of the sheets, or in the transverse direction which is perpendicular to the longitudinal direction. Rippling which generally occurs in the transverse direction, i.e. the direction perpendicular to the feed direction of the web is defined as oscillating elevations of the protected laminated image carrying medium above or below the plane of the major surface area of the protected laminated image carrying medium.

After postwrapping the bonded web and image carrying medium 34 throughout the arcuate distance of $\theta_1$, the throwaway layer 36, consisting of the web 11 and a part of the release layer 22, is separated from the protected laminated image carrying medium 34 by a delaminating assembly which in the preferred embodiment is in the form of an elongate delaminating bar 50 extending generally parallel to the laminating roller assemblies. In this regard, the throwaway layer 36 is wound onto take-up roller 52 (as shown in FIG. 4) with the assistance of the tension supplied by a pair of pull rolls 53. In the process, the throwaway layer 36 is brought against a delaminating surface 54 defined by the outside surface of the bar 50 with sufficient tension so as to effect separation or delamination of the throwaway layer 36 from the laminated image carrying medium 34. As noted, the protected laminated image carrying medium 34 includes the image bearing substrate 15, the image forming layer 14, the adhesive layer 18, the durable layer 20, and part of the release layer 22. The image bearing medium 34 is pulled under constant tension in a direction different from the throwaway layer by a pair of eject rolls 55.

As noted the sheet 10 can have a variety of widths and can be a continuous 32 inch wide member which spans between an idle supply roller 56 and a driven take-up roller 52. The width of the web 10 is set to ensure it's registration with the width of the image carrying medium 16. For instance, the image carrying medium 16 can vary in widths which vary from about eight inches to about 30 inches.

In accordance with the present invention it has been determined that for reducing the formation of pinholes in the image forming layer 14 during delamination at the delaminating bar 50, the heated temperature of the delaminating bar be controlled to be within a predetermined range which has been effective to reduce pinhole formations. The type of pinholes reduced are those of the removal type which are formed by the removal of carbon particles from the image forming layer 14 during delamination of the carrier web 11 and the release layer 22 from the laminated medium 34. It is believed that the significant reduction of the size of the pinholes, by as much as 90% when compared to other approaches in delaminating without the temperature being controlled as indicated, is due to the fact that the controlled heated temperature affects the release forces of the release layer 22, such that they are more uniform and thus, the adherence forces on the carbon by the adhesives on the medium 16 are overcome. As a result, the carbon is not readily pulled away with the throwaway layer 36. It has been found that the temperature range which is preferred in connection with effecting the pinhole size reduction for the materials above can be in a range of about 90° F. to about 160° F. with about 125° F. being preferred. If the temperatures are too high there might be a problem with fringing. Fringing occurs when a clean break between the protected laminated image carrying medium 34 and the throwaway layer 36 is not realized, so that pieces or strips of durable layer 20 and adhesive layer 18 remain attached in a stringy form to the edge of the protected laminated image carrying medium 34. In the illustrated embodiment, the delaminating bar 50 can be an elongated and hollow piece of anodized aluminum which extends generally parallel to the roller assemblies. It has been determined that such an aluminum bar has a thermal heat transfer coefficient which is effective for controlling heat exchange of the medium and layer 34 and 36; respectively so as to maintain the temperature within the noted temperature range. Of course, other materials besides aluminum can be used.

Figure 5:
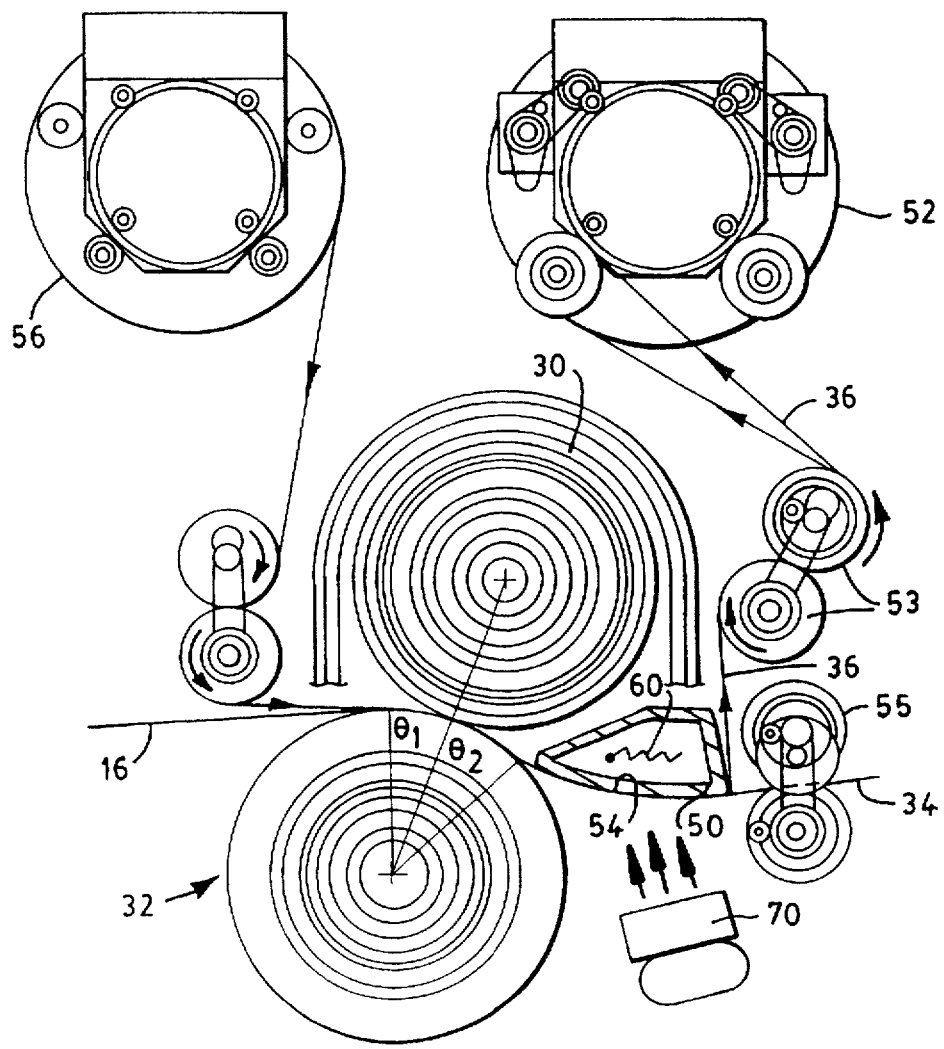

In the illustrated embodiment of FIG. 5, the delaminating bar 50 can have its temperature controlled so as to be actively heated by an electrical heating element 60 which is disposed therein. Temperature sensors, not shown, can regulate the temperature provided by the heating element so that the delaminating bar 50 remains in the desired temperature range for effecting the desired pinhole reduction. Also, depicted in FIG. 5, is a blower unit 70 which in this embodiment can be a fan which will be operated to blow air past the delaminating bar 50 for controlling the temperature thereof. The blower unit need not be used in conjunction with heater for effecting the desired temperature control although it is contemplated that such an arrangement is possible. Of course, appropriate temperature sensors, not shown, can be appropriately connected to the blower for controlling the latter.

Although several specific and preferred methods and system of the present invention have been shown and described above, other variations of the present invention will be come apparent to those skilled in the art. The scope of the invention is therefor not limited to the specific forms shown and described but rather is indicated by the claims below.

What is claimed is:

1. A system for delaminating a carrier web laminate carrying a protective overcoating material after the overcoating material has been laminated onto an image bearing layer carried on an image bearing medium by heat and pressure applying means; said system comprising: a delaminating assembly; means for advancing the carrier web in a first direction against said delaminating assembly and for advancing the laminate in a direction different from the carrier web so as to effect delamination; and, means for controlling the temperature of said delaminating assembly for reducing the formation of pinholes in the image bearing layer upon release of a release layer in the overcoating material during delamination; wherein said temperature controlling means is operable for maintaining said temperature in a range effective for reducing pinhole formation; and said temperature controlling means maintains the temperature of the sheet and web in range of about 115° F. to 160° F.

2. The system of claim 1 wherein said temperature controlling means for maintaining said temperature range is effective for minimizing fringing of the sheet.

3. The system of claim 1 wherein said temperature range is effective for minimizing curling and rippling of the image bearing medium.

4. The system of claim 1 wherein said temperature controlling means comprises means for actively heating and maintaining said delaminating assembly within said range.

5. The system of claim 4 wherein said heating means includes at least a heating element within said delaminating assembly for actively heating said delamination assembly to a temperature within said range.

6. The system of claim 1 wherein said temperature controlling means comprises at least a surface on said delamination assembly having a thermal heat transfer coefficient which is effective for controlling heat exchange of the medium so as to maintain the temperature of the delamination assembly within said range.

7. A method of delaminating a carrier web laminate carrying a protective overcoating material after the overcoating material has been laminated onto an image bearing layer on an image bearing medium by heat and pressure applying means; said method comprising the steps of: bending the carrier web against a delaminating assembly and transferring the web in a first direction; advancing the image bearing medium in a direction different from the first direction as the medium is advanced to effect delamination; and, controlling the temperature of the delaminating assembly for reducing the formation of pinholes in the image bearing layer upon release of a release layer in the overcoating material during delamination.

8. The method of claim 7 wherein said step of controlling the temperature includes the step of maintaining the temperature within a range effective for reducing pinhole formation.

9. The method of claim 8 wherein said step of maintaining the temperature in said range is also effective for minimizing fringing of the overcoat material.

10. The method of claim 8 wherein said step of maintaining the temperature in said range is also effective for minimizing curling and rippling of the image bearing medium.

11. The method of claim 8 wherein said step of maintaining the temperature in said range includes maintaining a range of about 90° F. to 160° F.

12. The method of claim 8 wherein said step of controlling the temperature includes actively heating the delaminating assembly by a heating element assembly.

13. The method of claim 8 wherein said step of controlling the temperature includes providing the delamination assembly with a surface having a thermal heat transfer coefficient which regulates the heat exchange of the medium so as to maintain the temperature of the delaminating assembly within the range.

14. A method of reducing pinhole formation in an image bearing layer on an image bearing medium which is being delaminated from a carrier web carrying a protective overcoating material thereon, the method comprising the steps of: delaminating a portion of the overcoating material from an image bearing medium by passing the web against a delaminating assembly in a direction which is different than the direction of advancement of the image bearing medium so as to effect delamination of the carrier web from the medium at a delamination point; and, controlling the temperatures of the delaminating assembly so as to optimize delamination of a release layer in the overcoating material in a manner which reduces the formation of pinholes in the image bearing layer.

15. A method of delaminating a carrier web laminate carrying a protective overcoating material including a durable layer and a release layer after the overcoating material has been laminated onto an image bearing layer on an image bearing medium by heat and pressure applying means; said method comprising the steps of: bending the carrier web against a delaminating assembly and transferring the web in a first direction; advancing the image bearing medium in a direction different from the first diction as the medium is advanced to effect delamination; and, controlling the temperature of the delaminating assembly for enhancing release of the release layer from the durable layer upon delamination of the carrier web laminate and release layer from the laminated overcoating material; thereby reducing the formation of pinholes in the image bearing layer.

* * * * *